(12) United States Patent  (10) Patent No.: US 8,756,009 B2
Arai  (45) Date of Patent: Jun. 17, 2014

(54) PORTABLE APPARATUS

(75) Inventor: Hirozumi Arai, Machida (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/593,644

(22) Filed: Aug. 24, 2012

(65) Prior Publication Data
US 2013/0054137 A1 Feb. 28, 2013

(30) Foreign Application Priority Data

Aug. 29, 2011 (JP) .................. 2011-186078

(51) Int. Cl.
*G01C 21/32* (2006.01)
(52) U.S. Cl.
CPC ...................... *G01C 21/32* (2013.01)
USPC ........................................ 701/457
(58) Field of Classification Search
CPC ...................................... G01C 21/005
USPC ........................................... 701/457
See application file for complete search history.

(56) References Cited

U.S. PATENT DOCUMENTS 6,282,362 B1 * 8/2001 Murphy et al. ................ 386/224
6,321,158 B1 * 11/2001 DeLorme et al. .............. 701/426
7,933,929 B1 * 4/2011 McClendon et al. ......... 707/802
8,350,849 B1 * 1/2013 Jones et al. .................... 345/419
2007/0276596 A1 * 11/2007 Solomon et al. .............. 701/211
2009/0292467 A1 * 11/2009 McNelis et al. ............... 701/300
2010/0123737 A1 * 5/2010 Williamson et al. .......... 345/672
2013/0261959 A1 * 10/2013 Kimishima .................... 701/445

FOREIGN PATENT DOCUMENTS

JP 4264099 2/2009

* cited by examiner

*Primary Examiner* — Thomas Tarcza
*Assistant Examiner* — Alex C Dunn
(74) *Attorney, Agent, or Firm* — John C. Pokotylo; Straub & Pokotylo

(57) ABSTRACT

A portable apparatus includes a position detection unit, an azimuth detection unit, a map image a display control unit acquisition unit, and an orientation detection unit. The position detection unit detects a position of the portable apparatus. The azimuth detection unit detects an azimuth of the portable apparatus. The map image acquisition unit acquires a map image within a range based on the position and the azimuth. The display control unit displays the acquired map image on a display unit. The orientation detection unit detects an orientation of the portable apparatus. The display control unit displays the map image on the display unit according to the detected orientation.

14 Claims, 12 Drawing Sheets

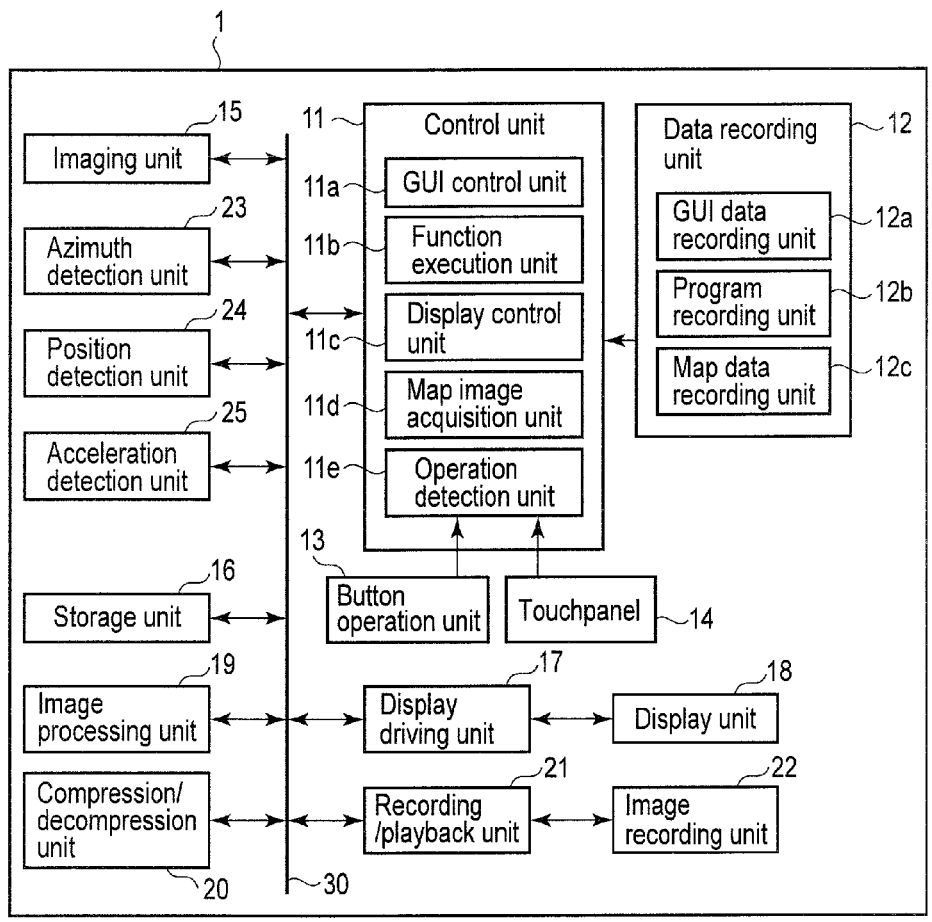
F I G. 1
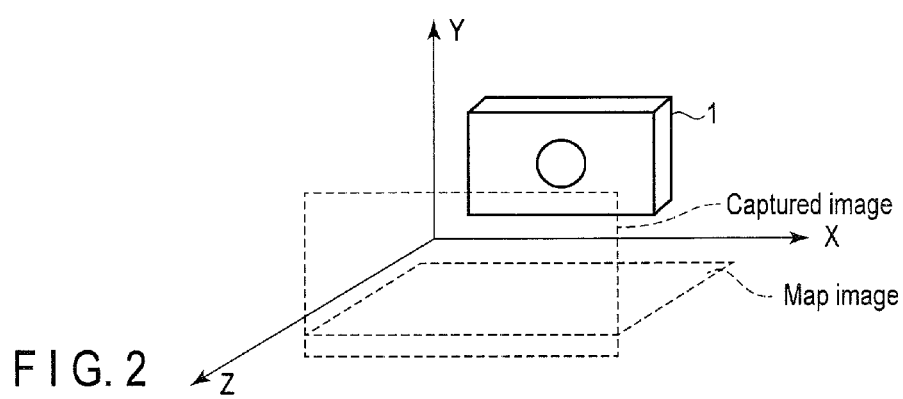
F I G. 2

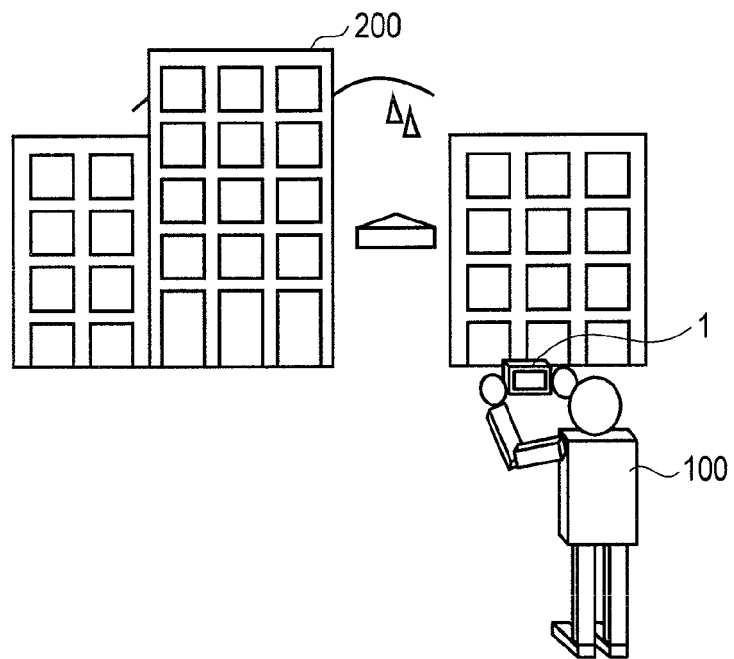
F I G. 3
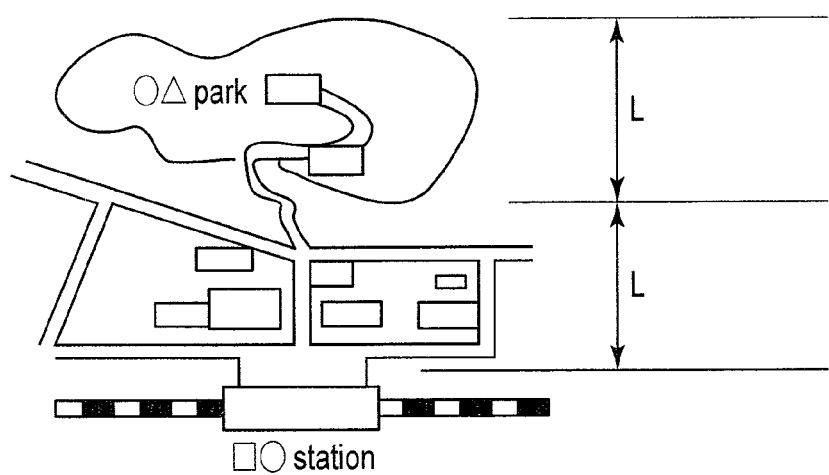
F I G. 4

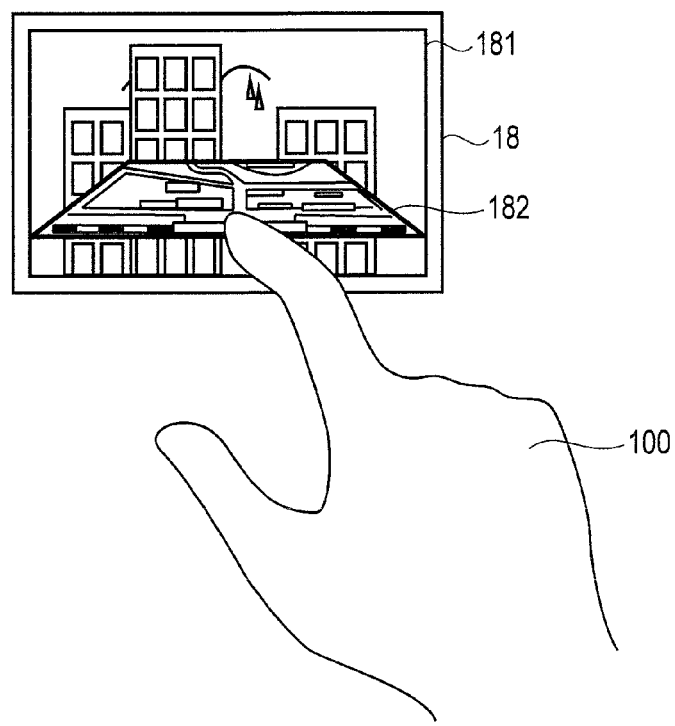
F I G. 8 A
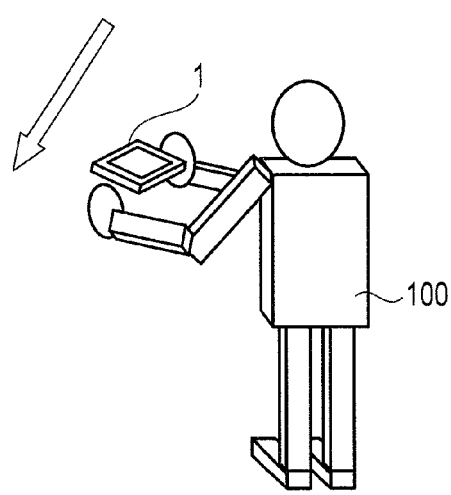
F I G. 8 B

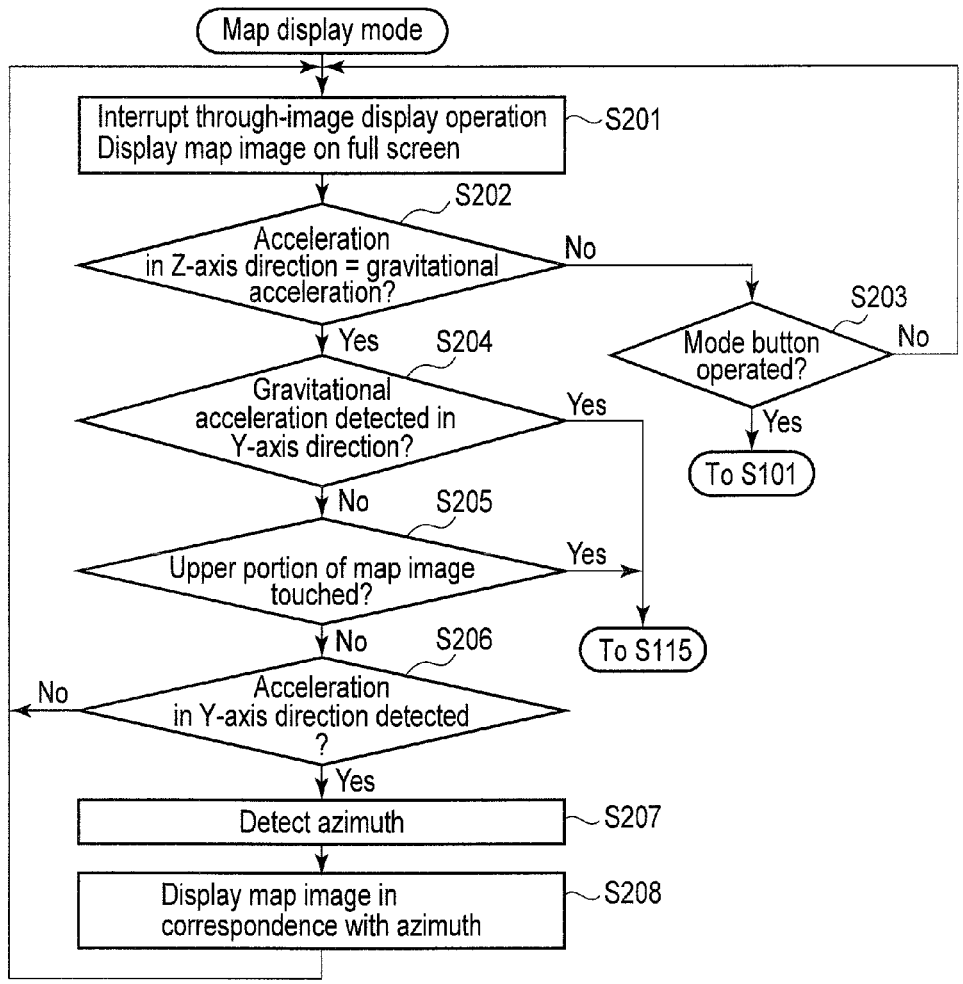
F I G. 1 2
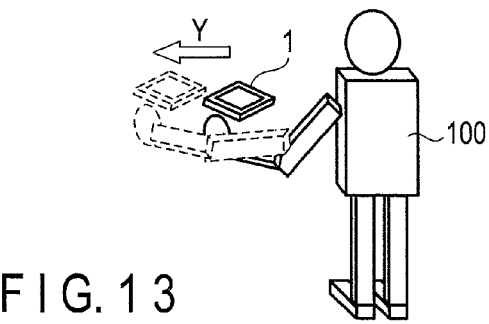
F I G. 1 3

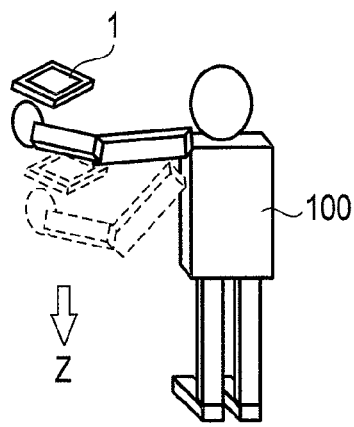
F I G. 15
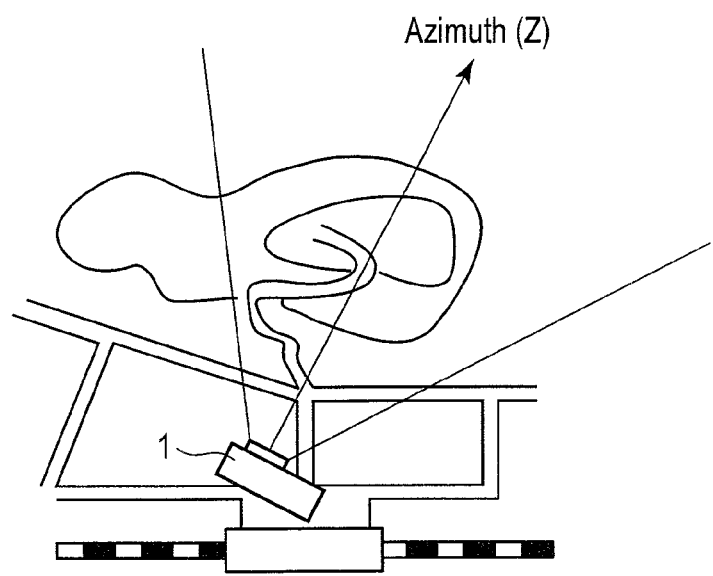
F I G. 16

US 8,756,009 B2

PORTABLE APPARATUS

CROSS-REFERENCE TO RELATED APPLICATIONS

This application is based upon and claims the benefit of priority from prior Japanese Patent Application No. 2011-186078, filed Aug. 29, 2011, the entire contents of which are incorporated herein by reference.

BACKGROUND OF THE INVENTION

1. Field of the Invention

The present invention relates to a portable apparatus which can display a captured image and map image.

2. Description of the Related Art

In recent years, portable apparatuses such as digital cameras, which can display a map image, have been proposed. For example, a portable apparatus proposed by Japanese Patent No. 4264099 has mounted on it a position detection unit such as a Global Positioning System (GPS) module, and is configured to display a map image of the region in the vicinity of the current position as detected by the position detection unit. Also, the portable apparatus proposed by Japanese Patent No. 4264099 can display an electronic viewfinder image (also called a through-image or the like). The portable apparatus of this literature is configured to switch an electronic viewfinder image and map image to be displayed according to an orientation change of the portable apparatus so as to smoothly switch the electronic viewfinder image and map image to be displayed.

BRIEF SUMMARY OF THE INVENTION

According to a first aspect of the invention, there is provided a portable apparatus comprising: a position detection unit configured to detect a position of the portable apparatus; an azimuth detection unit configured to detect an azimuth of the portable apparatus; a map image acquisition unit configured to acquire a map image within a range based on the position and the azimuth; a display control unit configured to display the acquired map image on a display unit; and an orientation detection unit configured to detect an orientation of the portable apparatus, wherein the display control unit displays the map image on the display unit according to the detected orientation.

According to a second aspect of the invention, there is provided a portable apparatus comprising: a position detection unit configured to detect a position of the portable apparatus; an azimuth detection unit configured to detect an azimuth of the portable apparatus; a map image acquisition unit configured to acquire a map image within a range based on the position and the azimuth; a display control unit configured to display the acquired map image on a display unit; and an orientation detection unit configured to detect an orientation of the portable apparatus, wherein the display control unit is configured to display the map image on the display unit to be horizontally seen when a direction of a display surface discriminated from an orientation of the portable apparatus detected by the orientation detection unit is perpendicular to a ground surface.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a digital camera as an example of a portable apparatus according to an embodiment of the present invention;

FIG. 2 is a view showing the relationship between directions of a captured image and map image;

FIG. 3 shows a state when the user holds the digital camera;

FIG. 4 shows an example of a map image;

FIGS. 8A and 8B are views showing a switching operation from a superimposed display operation to the enlarged display operation of a map image;

FIG. 12 is a flowchart showing control of a map display mode;

FIG. 13 is a view showing a switching operation of a display range of the map image in the map display mode;

FIG. 15 is a view showing a display operation of the map image in the play mode;

FIG. 16 is a view showing an example of map image data having altitude information.

DETAILED DESCRIPTION OF THE INVENTION

Figure 5A:
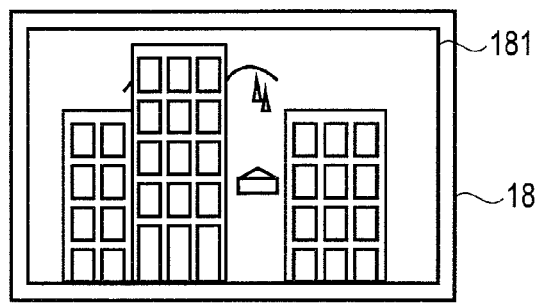
FIGS. 5A, 5B, and 5C show a display example of a map image during a through-image display operation according to the embodiment of the present invention.

An embodiment of the present invention will be described hereinafter with reference to the drawings.

FIG. 1 is a block diagram showing the configuration of a digital camera as an example of a portable apparatus according to an embodiment of the present invention. A digital camera (to be referred to as a camera hereinafter) 1 according to this embodiment has a control unit 11, data recording unit 12, button operation unit 13, touchpanel 14, imaging unit 15, storage unit 16, display driving unit 17, display unit 18, image processing unit 19, compression/decompression unit 20, recording/playback unit 21, image recording unit 22, azimuth detection unit 23, position detection unit 24, and acceleration detection unit 25.

The control unit 11 includes, for example, a central processing unit (CPU), and systematically controls the operation of the camera 1. This control unit 11 has functions as a graphical user interface (GUI) control unit 11a, function execution unit 11b, display control unit 11c, map image acquisition unit 11d, and operation detection unit 11e. The function as the GUI control unit 11a receives GUI display data recorded in a GUI data recording unit 12a of the data recording unit 12, and outputs the GUI display data to the display driving unit 17 to display a GUI screen on the display unit 18. The function as the function execution unit 11b executes the operation of the camera 1 according to operation of the button operation unit 13 or touchpanel 14 detected by the function of the operation detection unit 11e. The function as the display control unit 11c controls to display various images based on captured image data recorded in the image recording unit 22, map image data recorded in the map data recording unit 12c, and the like on the display unit 18. The function as the map image acquisition unit 11d acquires map image data within a predetermined range from the map data recording unit 12c based on outputs of the azimuth detection unit 23, position detection unit 24, and the like. The function as the operation detection unit 11e detects operations of the button operation unit 13 or touchpanel 14 by detecting operation signals from the button operation unit 13 or touchpanel 14.

The control unit 11 is connected to the imaging unit 15, storage unit 16, display driving unit 17, image processing unit 19, compression/decompression unit 20, recording/playback unit 21, azimuth detection unit 23, position detection unit 24, and acceleration detection unit 25 via a bus line 30.

The data recording unit 12 includes an electrically rewritable nonvolatile memory such as a flash memory. This data recording unit 12 has recording areas as the GUI data recording unit 12a, a program recording unit 12b, and the map data recording unit 12c. The GUI data recording unit 12a is a recording area used to record GUI display data. The GUI display data is information required to display, on the display unit 18, a GUI screen which allows operations on the display screen of the display unit 18. This GUI display data includes icon data, and the like. The program recording unit 12b is a recording area used to record control programs of the camera 1, which are executed by the function execution unit 11b, and control parameters required to execute the control programs. The map data recording unit 12c is a recording area used to record map image data. The map image data is associated with position (longitude/latitude) information.

The button operation unit 13 includes operation members such as a release button, power button, zoom button, mode button, four-way button, enter button, and the like, which are operated by pressing operations. Each button outputs a signal in response to a pressing operation. In this case, the release button is used by the user to instruct a shooting timing. The power button is used to instruct to turn on or off a power supply of the camera 1. The zoom button is used to instruct zooming. The mode button is used to change an operation mode of the camera 1. The four-way button is used to select an item in, for example, the GUI screen. The enter button is used to decide an item in, for example, the GUI screen. The aforementioned buttons need not always be configured as button type operation members.

The touchpanel 14, which functions as an example of a touch detection unit, is arranged to overlap, for example, the display screen of the display unit 18. When the user touches this touchpanel 14 by the finger or the like, the touchpanel 14 outputs a signal from the touched position. This touchpanel 14 detects a touch operation on each icon displayed on the GUI screen.

The imaging unit 15 has a camera unit and imaging processing unit.

The camera unit is used to capture an object image, and includes an imaging optical system, image sensor, stop, shutter, AF mechanism, AF driving circuit, zoom mechanism, zoom driving circuit, and the like. The imaging optical system has a plurality of lenses such as a focus lens, zoom lens, and the like, and forms an object image on the image sensor by condensing that image. The image sensor is, for example, a two-dimensional solid-state image sensor such as a CCD sensor or CMOS sensor. The image sensor photoelectrically converts an object image input via the imaging optical system, and outputs it as an analog electrical signal. The stop is arranged in, for example, the imaging optical system, and limits a light beam which enters the image sensor via the imaging optical system when it is stopped down. The shutter is configured to be movable with respect to, for example, a light-receiving surface of the image sensor, and sets the light-receiving surface of the image sensor in a light-shielding or exposed state. The AF mechanism is required to drive the focus lens. By driving the focus lens, a focal point position of the imaging optical system is adjusted. The AF driving circuit is required to drive the AF mechanism. The zoom mechanism is required to drive the zoom lens. By driving the zoom lens, a field angle of the imaging optical system is adjusted. The zoom driving circuit is required to drive the zoom mechanism.

The imaging processing unit has an image sensor driving circuit, analog processing circuit, A/D conversion circuit, and the like. The image sensor driving circuit drives the image sensor, and reads out an analog electrical signal from the image sensor. The analog processing circuit applies analog signal processing such as automatic gain control (AGC) processing and correlated double sampling (CDS) processing to the analog electrical signal output from the image sensor. The AGC processing amplifies the analog electrical signal from the image sensor by a predetermined gain. The CDS processing removes dark current noise and the like included in the analog electrical signal. The analog-to-digital conversion circuit converts the analog electrical signal, which has undergone the analog processing by the analog processing circuit, into a digital electrical signal, and outputs the digital electrical signal.

The storage unit 16 includes, for example, an SDRAM. This storage unit 16 is used as a working area when the control unit 11 or the like executes various kinds of processing. The storage unit 16 is also used to temporarily store various data such as the digital electrical signal (also called RAW data or the like) obtained by the imaging unit 15, captured image data obtained by processing in the image processing unit 19, and the like.

The display driving unit 17 has a digital-to-analog conversion circuit and the like. The display driving unit 17 resizes captured image data, map image data, and the like received from the control unit 11 to fit the size of the display screen of the display unit 18, and outputs the resized captured image data, map image data, and the like to the display unit 18, thus displaying images on the display unit 18.

The display unit 18 is connected to the display driving unit 17, and includes, for example, a liquid crystal display (LCD), electroluminescent display (ELD), or the like. This display unit 18 is arranged to expose from, for example, the main body back surface of the camera 1, and displays various images such as a captured image, map image, through-image, and the like based on image data input from the display driving unit 17. Also, the display unit 18 displays the GUI screen based on the GUI display data input from the display driving unit 17.

The image processing unit 19 applies image processing to the digital electrical signal output from the imaging unit 15 to obtain captured image data. This image processing includes pixel interpolation processing, color correction processing, gamma processing, and the like. The pixel interpolation processing adds data of a plurality of neighboring pixels, and generates data of a new pixel from data of a plurality of neighboring pixels. The color correction processing corrects a color of an image to that suited to be displayed or recorded. The gamma processing corrects an image tone to that suited to be displayed or recorded. This image processing unit 19 applies recording image processing in a recording operation (shooting mode) and applies simple image processing for display in a through-image display operation.

The compression/decompression unit 20 applies compression processing based on, for example, a known JPEG method to captured image data obtained by the image processing unit 19 in the recording operation (shooting mode). Also, the compression/decompression unit 20 applies decompression processing based on the known JPEG method to compressed captured image data recorded in the image recording unit 22 in a play mode.

The recording/playback unit 21 writes an image file in the image recording unit 22 and reads out an image file from the image recording unit 22. The recording/playback unit 21 according to the type of the image recording unit 22 is used. Also, the recording/playback unit 21 deletes some image files recorded in the image recording unit 22, and initializes a recording state of the image recording unit 22 (to delete all image files).

The image recording unit 22 is a recording medium used to record image files. This image recording unit 22 is, for example, a recording medium such as an SD Card® or CompactFlash® card, which is detachable from the camera main body, or a recording medium such as a hard disc drive (HDD), which is incorporated in the camera main body.

The azimuth detection unit 23 detects the current azimuth (for example, that with reference to north) of the camera 1. This azimuth detection unit 23 includes, for example, an electronic compass. Based on the azimuth detected by the azimuth detection unit 23, a direction of the imaging optical system can also be detected.

The position detection unit 24 detects the current position (for example, longitude and latitude) of the camera 1. This position detection unit 24 is, for example, a GPS module, and detects the current position of the camera 1 by receiving signals from a plurality of GPS satellites (not shown).

The acceleration detection unit 25 detects accelerations produced with respect to the camera 1. This acceleration detection unit 25 has three acceleration detection units which respectively detect accelerations in three-axis directions set on the main body of the camera 1, as shown in, for example, FIG. 2. In the example shown in FIG. 2, when the user holds the camera 1 at a landscape position, a direction, which is parallel to the ground surface and is perpendicular to the optical axis of the imaging optical system, is set as an X-axis, a direction, which is perpendicular to the ground surface, is set as a Y-axis, and a direction, which is parallel to the ground surface and is also parallel to the optical axis of the imaging optical system, is set as a Z-axis. A positive direction of the X-axis is the left-hand direction when the camera 1 is viewed from the front side, a positive direction of the Y-axis is the skyward direction when the camera 1 is viewed from the front side, and a positive direction of the Z-axis is a direction toward the front side of the camera 1.

In this case, the orientation of the camera 1 can also be detected depending on which of the acceleration detection units included in the acceleration detection unit 25 detects gravitational force. In this case, the acceleration detection unit 25 also serves as an orientation detection unit. The accelerations and orientations may be detected by independent acceleration detection units, or the orientation may be detected using an angular velocity detection unit or the like.

The operation of the portable apparatus according to this embodiment will be described below. Upon recording a captured image, a user 100 directs the camera 1 toward an object (for example, a building) 200 while holding it, as shown in FIG. 3. At this time, an image in a plane perpendicular to the ground surface including the object 200 is acquired as a captured image. In contrast, assume that map image data recorded in the map data recording unit 12c is image data which indicates a bird's eye map view, as shown in FIG. 4. In this case, the direction of the captured image and that of the map image are perpendicular to each other, as shown in FIG. 2.

For example, assume that a through-image display operation is made in a state in which the user holds the camera 1, as shown in FIG. 3. In a through-image display operation, a captured image 181 for the through-image display operation (to be referred to as a through-image hereinafter), which is obtained via the imaging unit 15, is sequentially displayed on the display unit 18, as shown in FIG. 5A. With this through-image display operation, the display unit 18 can be used as a viewfinder.

Figure 5B:
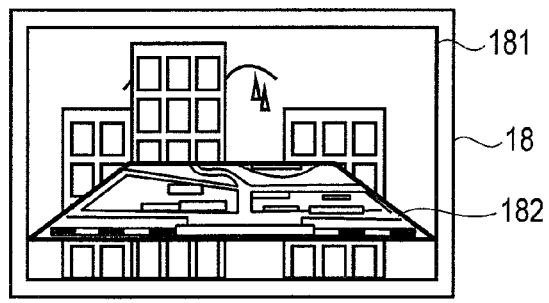
Figure 6:
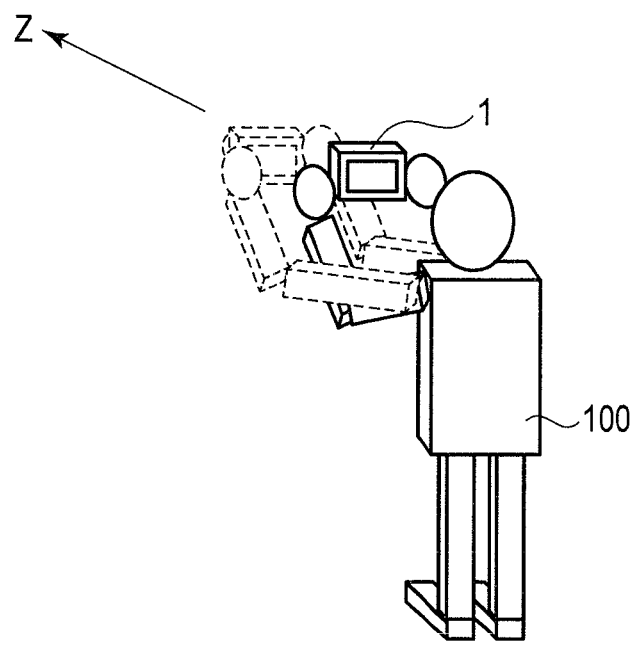
FIG. 6 is a view showing an operation required to display a map image.

In this embodiment, by moving the camera 1 forward (by making an operation for applying an acceleration in the Z-axis direction), as shown in FIG. 6, a map image is displayed during the through-image display operation. In this case, during the through-image display operation, it is desirable to specify an object in the direction of the camera 1. For this reason, this embodiment displays a map image within a predetermined range in, for example, a direction parallel to the current azimuth of the camera 1 detected by the azimuth detection unit 23 from the current position of the camera 1 detected by the position detection unit 24. In this case, when the map image shown in FIG. 4 is displayed intact on the display unit 18, since the display surface of the display unit 18 is perpendicular to the ground surface, the direction of the map image does not correspond to an actual landscape. Therefore, in this embodiment, the map image is shaped into a trapezoidal shape, as shown in FIG. 5B, and is then superimposed on the through-image. In this trapezoidal shape, the width of a side farther from the current position of the camera 1 (to be referred to as an upper side hereinafter) is shorter than that of a side closer to the current position of the camera 1 (to be referred to as a lower side hereinafter). Also, the direction of the map image is set so that the upper side of the map image is located on the upper side of the display unit 18, as shown in FIG. 5B. Furthermore, an index indicating a place name in the map image, an index indicating a scale of the map image, an index indicating the current location, and the like may be displayed together with the map image.

By superimposing a map image 182, as shown in FIG. 5B, the relationship between the through-image and map image corresponds to that shown in FIG. 2. For this reason, the user can easily ascertain the relationship between the through-image and map image. Also, since the operation required to display the map image is attained by that for moving the camera 1 forward, as shown in FIG. 6, the user can make the operation while keeping the display surface of the display unit 18 to be perpendicular to the ground surface. For this reason, the user can make the display operation of the map image while holding the camera 1 with both hands and viewing the through-image.

Figure 5C:
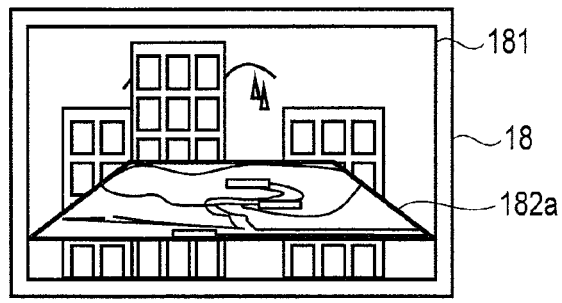

In this embodiment, after the map image 182 is displayed, as shown in FIG. 5B, when the user moves the camera 1 forward again, the display range of the map image is switched. At this time, a map image 182a within a predetermined range farther than the current display range is superimposed on the through-image 181, as shown in FIG. 5C. The user can also make the switching operation of the display range of the map image while holding the camera 1 with both hands and viewing the through-image.

Figure 7:
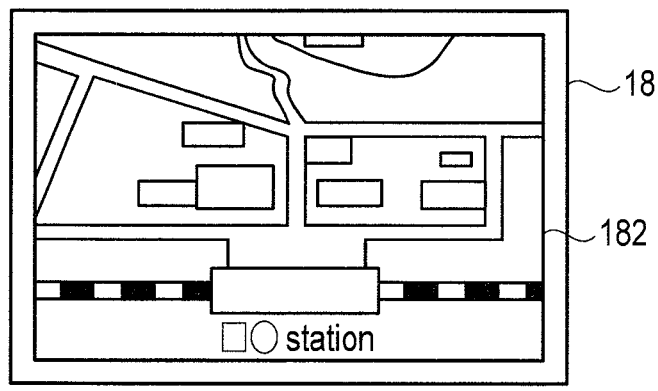
FIG. 7 shows a map image displayed in an enlarged scale.

In the display state shown in FIG. 5B or 5C, the user can simultaneously view both the through-image and map image. Furthermore, when the user makes a predetermined operation in the display state shown in FIG. 5B or 5C, the map image 182 is displayed in an enlarged scale, as shown in FIG. 7. The predetermined operation required to attain this display state includes, for example, an operation for touching a lower portion of the map image 182, as shown in FIG. 8A, an operation for casting down the camera 1, as shown in FIG. 8B, and the like. Operations other than those shown in FIGS. 8A and 8B may be used. In the enlarged-scale display state shown in FIG. 7, the display area of the map image can be broadened compared to the display state shown in FIG. 5B or 5C.

Figure 9A:
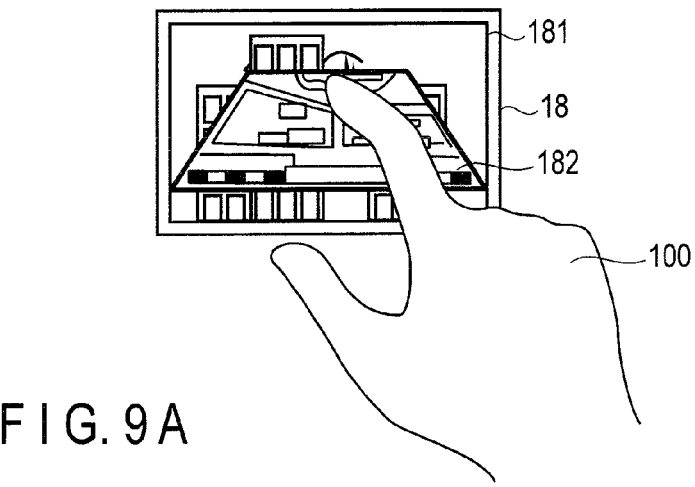
FIGS. 9A, 9B, and 9C are views showing a switching operation from the enlarged display operation to the superimposed display operation of the map image.
Figure 9B:
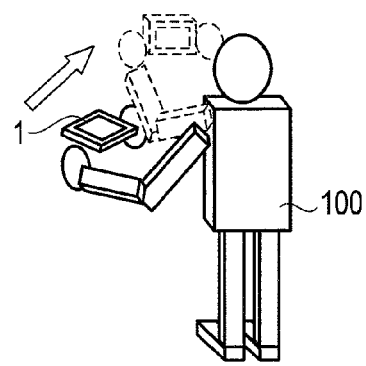
Figure 9C:
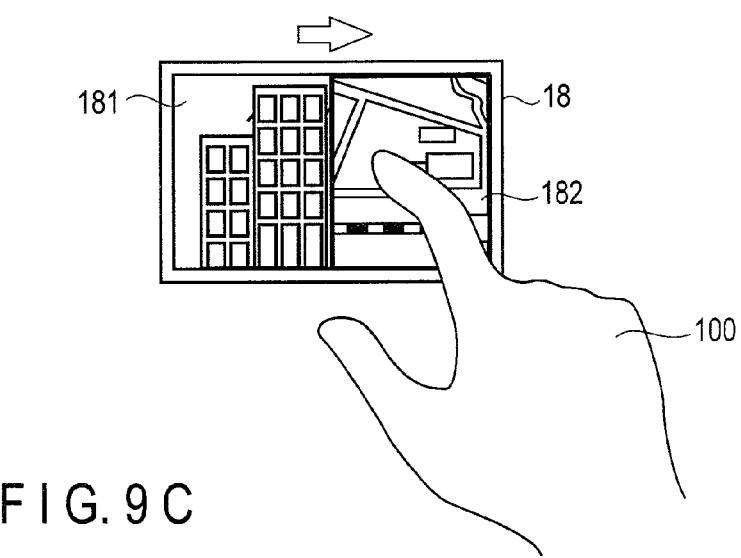

When the user makes an operation opposite to that shown in FIG. 8A or 8B in the enlarged-scale display state shown in FIG. 7, the display state is made to revert to that shown in FIG. 5B or 5C. That is, when the user makes an operation for touching an upper portion of the map image 182, as shown in FIG. 9A or an operation for casting up the camera 1, as shown in FIG. 9B, the display state is reverted to. In addition, the display state may be reverted to that shown in FIG. 5A, 5B, or 5C in response to an operation for sliding the finger so as to move the map image 182 outside the screen, as shown in FIG. 9C. When the user makes the operation shown in FIG. 9A, 9B, or 9C, the display state may be reverted to the through-image display state shown in FIG. 5A in place of the display state shown in FIG. 5B or 5C.

Figure 10:
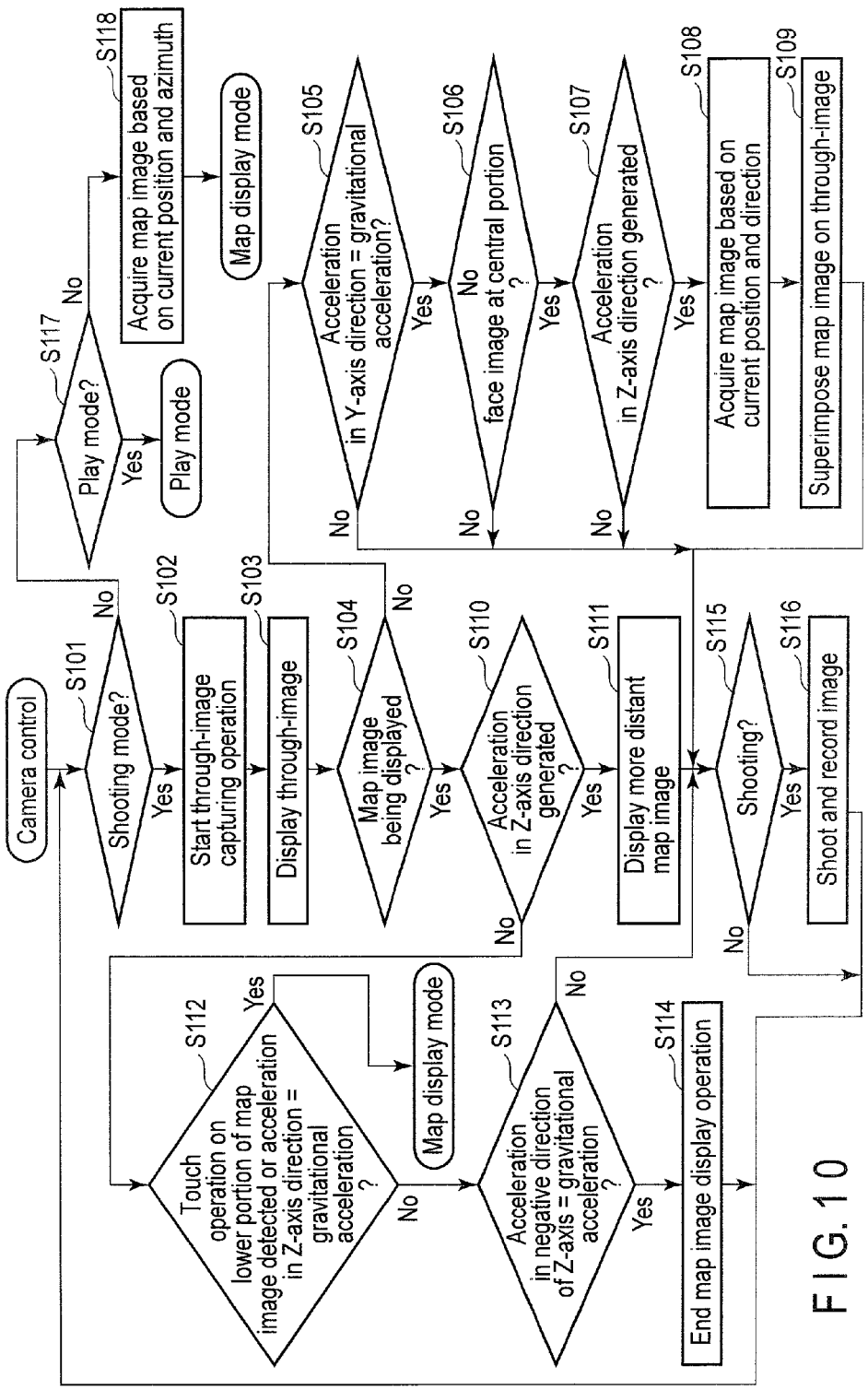
FIG. 10 is a flowchart showing control of a shooting mode of the digital camera according to the embodiment of the present invention.

Details of the aforementioned map image display operation will be described below. FIG. 10 is a flowchart showing control of the shooting mode executed by the control unit 11 of the camera 1. When the power switch of the camera 1 is turned on, the control unit 11 reads out a control program recorded in the program recording unit 12b and starts control shown in FIG. 10. After that, the control unit 11 controls the azimuth detection unit 23, position detection unit 24, and acceleration detection unit 25 to start their operations.

Referring to FIG. 10, the control unit 11 determines whether or not the operation mode of the camera 1 is the shooting mode (step S101). The camera 1 according to this embodiment has, as operation modes, at least the shooting mode, a play mode, and a map display mode. The shooting mode is the operation mode used to obtain a captured image to be recorded. The play mode is the operation mode used to play back captured images recorded in the image recording unit 22. The map display mode is the operation mode used to display an enlarged map image, as shown in FIG. 7. These operation modes are switched by, for example, operating the mode button by the user.

If it is determined in step S101 that the operation mode is the shooting mode, the control unit 11 controls the imaging unit 15 to capture an image to be displayed as a through-image (step S102). Then, the control unit 11 displays the through-image (step S103). Upon displaying the through-image, the control unit 11 controls the image processing unit 19 to apply image processing for through-image display to a digital electrical signal for through-image display obtained via the imaging unit 15, and outputs through-image data obtained by this image processing to the display driving unit 17. Upon reception of this data, the display driving unit 17 displays the through-image shown in FIG. 5A on the display unit 18.

After the through-image display operation, the control unit 11 determines whether or not a map image is being displayed (step S104). If it is determined in step S104 that a map image is not being displayed, the control unit 11 determines whether or not the output from the acceleration detection unit 25, which detects an acceleration in the Y-axis direction, indicates a gravitational acceleration (about 9.8 m/s$^2$) (step S105).

If it is determined in step S105 that the output from the acceleration detection unit 25, which detects an acceleration in the Y-axis direction, indicates the gravitational acceleration, that is, if it is considered that the camera 1 is held, as shown in FIG. 3, and the display surface of the display unit 18 faces the user, the control unit 11 determines whether or not a face image exists at a central portion of the through-image data obtained by the image processing unit 19 (step S106). For example, if feature amounts of a face are not detected from the central portion of the through-image data, it is determined in step S106 that no face image exists. In addition, as a simple method, for example, if a nearly circular contour is not extracted at the central portion of the through-image data, it may be determined that no face image exists. The reason why the determination process in step S106 is executed is that the map image display operation is mainly used upon shooting a landscape image. When a map image is to be displayed independently of purpose of use, the determination process in step S106 is omitted.

If it is determined in step S106 that no face image exists at the central portion of the through-image data, that is, it is determined that a landscape image is to be shot, the control unit 11 determines whether or not an acceleration in the Z-axis direction has been produced (step S107). In step S107, for example, when the output from the acceleration detection unit 25, which detects an acceleration in the Z-axis direction, assumes a predetermined value or more, it is determined that the acceleration in the Z-axis direction has been produced. For example, this acceleration threshold is recorded in advance in the program recording unit 12b as a control parameter.

If it is determined in step S105 that the output from the acceleration detection unit 25, which detects an acceleration in the Y-axis direction, does not indicate a gravitational acceleration, if it is determined in step S106 that a face image exists at the central portion of the through-image data, or if it is determined in step S107 that the output from the acceleration detection unit 25, which detects an acceleration in the Z-axis direction, does not assume the predetermined value or more, the control unit 11 advances the process to step S115.

If it is determined in step S107 that the output from the acceleration detection unit 25, which detects an acceleration in the Z-axis direction, assumes the predetermined value or more, that is, if the forward movement of the camera 1 shown in FIG. 6 is detected, the control unit 11 acquires map image data from the map data recording unit 12c (step S108).

Figure 11A:
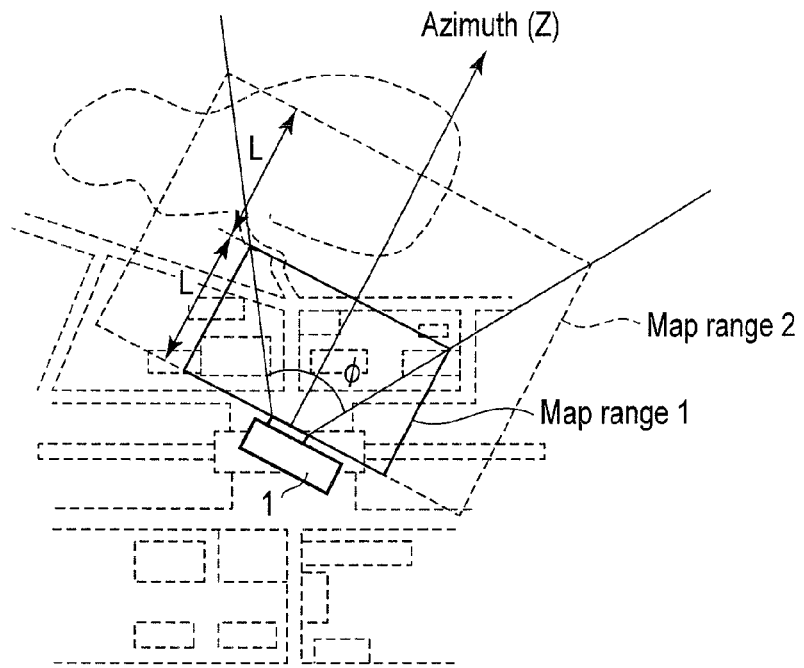
FIGS. 11A and 11B are views for explaining acquisition processing of map image data.

The acquisition processing of the map image data in step S108 will be described below. As a first example, map image data is acquired in consideration of a field angle of the camera 1. For example, assuming that the camera 1 is located at a position of FIG. 11A on a map, and the imaging optical system of the camera 1 directs to the azimuth shown in FIG. 11A, a captured image within a range specified by a field angle ϕ in FIG. 11A is acquired. In the first example, a map image within the range corresponding to the field angle ϕ is displayed. For example, as shown in FIG. 11A, map image data within a rectangular range, which includes the current position of the camera 1, and has a side in a direction perpendicular to the current azimuth of the camera 1 as a lower side and a side separated by an integer multiple of a predetermined distance L (for example, 1 km) in a direction parallel to the current azimuth of the camera 1 from this lower side as an upper side, that is, a range in which the length of the upper side corresponds to the field angle φ, as shown in FIG. 11A, is acquired. More specifically, in the first example, map image data within a rectangular range, which includes the current position of the camera 1, and has a width (n×L) (n=1, 2, . . . ) in a direction parallel to the current azimuth of the camera 1 and a width (2×n×L tan(φ/2)) in a direction perpendicular to the current azimuth of the camera 1, is acquired. The value n has "1" as an initial value, and is incremented by "1" every time an acceleration in the positive direction of the Z-axis acts on the camera 1. In this case, in the processing of step S108, map image data indicated by map range 1 in FIG. 11A is acquired. When an acceleration in the positive direction of the Z-axis is detected again in step S111 later, map image data indicated by map range 2 in FIG. 11A is acquired. In such first example, a map image which allows the user to recognize landmarks that can be shot from the current position can be displayed.

Note that the aforementioned map image data acquisition processing may fail to acquire corresponding map image data. In such case, it is desirable to display a warning message indicating that the corresponding map image data is not available for the user. In this case, for example, the control unit 11 displays the warning message on the display unit 18. In addition, if an audio playback unit is included, an audible warning message may be generated.

Figure 11B:
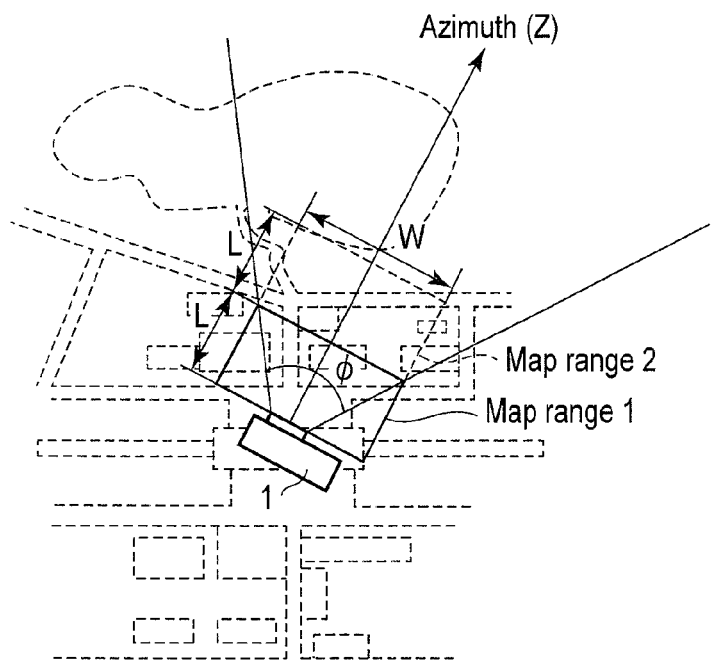

As a second example, map image data may be acquired regardless of a field angle of the camera 1. In the second example, map image data within a rectangular range, which includes the current position of the camera 1, and has a side having a predetermined width W in a direction perpendicular to the azimuth of the camera 1 as a lower side, and a side having the predetermined width W separated by an integer multiple of a predetermined distance L (for example, 1 km on a map image) in a direction parallel to the current azimuth of the camera 1 from this lower side as an upper side, as shown in FIG. 11B, is acquired. More specifically, in the second example, map image data within a rectangular range, which includes the current position of the camera 1, has a width (n×L) (n=1, 2, . . . ) in a direction parallel to the current azimuth of the camera 1 and the width W of the side perpendicular to the azimuth of the camera 1, is acquired. The value n has "1" as an initial value, and is incremented by "1" every time an acceleration in the positive direction of the Z-axis acts on the camera 1. In this case, in the processing of step S108, map image data indicated by map range 1 in FIG. 11B is acquired. When an acceleration in the positive direction of the Z-axis is detected again in step S111 later, map image data indicated by map range 2 in FIG. 11B is acquired. In such second example, a map image which allows the user to find an object in the direction of the camera 1 can be displayed. In the second example, calculations of the range of the map image data can be simplified compared to the first example.

In the first and second examples, map image data farther by L is acquired every time the camera 1 is moved forward. In contrast, L may be variable. For example, L may be set according to the magnitude of the acceleration in the positive direction of the Z-axis or according to a focal length of the imaging optical system, that is, a zoom state of the zoom lens. Furthermore, L may be changed by combining them.

For example, when L is set according to the magnitude of the acceleration, a relationship between L and the magnitude of the acceleration is defined: for example, $L=(\alpha_Z/\alpha_0) \times L_0$ where $\alpha_Z$ is an acceleration in the Z-axis direction, $\alpha_0$ is the magnitude of a predetermined acceleration, for example, a gravitational acceleration or a maximum acceleration detectable by the acceleration detection unit 25, and $L_0$ is a predetermined value (for example, 1 km on a map image). In this manner, by varying L according to the acceleration, the user need not move the camera 1 many times to display, for example, a distant map image.

When L is set according to the zoom state, a relationship between L and the zoom position is defined. This relationship is stored in, for example, the map data recording unit 12c as a table. Note that this table is set so that L when the zoom lens is located at the wide-angle side is shorter than that when the zoom lens is located at the telephoto side.

Referring back to FIG. 10, after the map image data is acquired, the control unit 11 displays a map image based on the acquired map image data to be superimposed on the through-image (step S109). After that, the control unit 11 advances the process to step S115. In step S109, the control unit 11 inputs the map image data to the display driving unit 17. The display driving unit 17 resizes the input map image data to fit the size of the display screen of the display unit 18, shapes it into a trapezoidal shape, and displays the map image data shaped into the trapezoidal shape on the display unit 18 to be superimposed on the through-image data. In this case, the height of the trapezoidal map image data is, for example, half of the original data. Also, a ratio between the lengths of the upper and lower sides is, for example, 1:2. These values are examples, and can be changed as needed.

If it is determined in step S104 that the map image is being displayed, the control unit 11 determines whether or not an acceleration in the Z-axis direction has been produced again (step S110).

If it is determined in step S110 that an acceleration in the Z-axis direction has been produced again, the control unit 11 displays a more distant map image in a direction parallel to the current azimuth of the camera 1 to be superimposed on the through-image (step S111). After that, the control unit 11 advances the process to step S115. The process in step S111 is the same as those in steps S108 and S109, except that map image data within the range by incrementing the value n by "1" is newly acquired, and is displayed on the display unit 18.

If it is determined in step S110 that an acceleration in the Z-axis direction has not been produced again, the control unit 11 determines based on the output from the touchpanel 14 whether or not the user has made a touch operation on the lower portion of the map image displayed on the display unit 18, and also determines whether or not the output from the acceleration detection unit 25, which detects an acceleration in the Z-axis direction, indicates a gravitational acceleration (step S112).

If it is determined in step S112 that the user has made a touch operation on the lower portion of the map image or that the output from the acceleration detection unit 25, which detects an acceleration in the Z-axis direction, indicates a gravitational acceleration, that is, if it is considered that the orientation of the camera 1 has been changed to a downward orientation (the imaging optical system faces the ground surface), the control unit 11 executes control of the map display mode (to be described later).

If it is determined in step S112 that the user has not made any touch operation on the map image and that the output from the acceleration detection unit 25, which detects an acceleration in the Z-axis direction, does not indicate a gravitational acceleration, the control unit 11 determines whether or not the output from the acceleration detection unit 25, which detects an acceleration in the Z-axis direction, indicates a negative gravitational acceleration (step S113). The state in which the output from the acceleration detection unit 25, which detects an acceleration in the Z-axis direction, indicates a negative gravitational acceleration indicates a state in which the camera 1 has an upward orientation, and gravitational force acts on the back surface side of the camera 1.

If it is determined in step S113 that the output from the acceleration detection unit 25, which detects an acceleration in the Z-axis direction, does not indicate a negative gravitational acceleration, the control unit 11 advances the process to step S115. In contrast, if it is determined in step S113 that the output from the acceleration detection unit 25, which detects an acceleration in the Z-axis direction, indicates a negative gravitational acceleration, that is, if it is considered that the orientation of the camera 1 has been changed to an upward orientation, the control unit 11 instructs the display driving unit 17 to end the display operation of the map image (step S114). After that, the control unit 11 returns the process to step S101.

If NO is determined in step S105, S106, S107, or S113 or after step S109 or S111, the control unit 11 determines whether or not the user inputs a shooting execution instruction, that is, whether or not the user has pressed the release button (step S115).

If it is determined in step S115 that the user does not input any shooting execution instruction, the control unit 11 returns the process to step S101. If it is determined in step S115 that the user inputs a shooting execution instruction, the control unit 11 executes a shooting operation and recording operation (step S116). In the shooting operation, the control unit 11 controls the AF driving circuit to drive the AF mechanism, thereby driving the focus lens to adjust a focal point position of the imaging optical system. After that, the control unit 11 controls the imaging unit 15 to start an imaging operation while driving the stop and shutter. Subsequently, the control unit 11 controls the image processing unit 19 to apply recording image processing to a digital electrical signal to be recorded obtained via the imaging unit 15. Then, the control unit 11 controls the compression/decompression unit 20 to compress captured image data obtained by the image processing. After that, the control unit 11 generates an image file by appending header information to the compressed captured image data, and records the generated image file in the image recording unit 22 via the recording/playback unit 21. In this case, as the header information, a file name, shot date & time information, longitude information K and latitude information I of a shooting location, and the like are recorded in addition to values of the stop and shutter, zoom state, and the like.

In this case, upon execution of the recording operation, the map image data, which is superimposed on the through-image data immediately before the shooting operation, may be recorded in the image recording unit 22 together with the image file. In this case, the captured image data and map image data may be recorded in a single file or in independent files. The map image data after it is shaped into the trapezoidal shape may be recorded or that before it is shaped into the trapezoidal shape may be recorded.

If it is determined in step S101 that the operation mode is not the shooting mode, the control unit 11 determines whether or not the operation mode is the play mode (step S117). If it is determined in step S117 that the operation mode is the play mode, the control unit 11 executes processing of the play mode (to be described later). If it is determined in step S117 that the operation mode is not the play mode, that is, the operation mode is the map display mode, the control unit 11 acquires map image data from the map data recording unit 12c (step S118). After that, the control unit 11 executes processing of the map display mode (to be described later). In this case, the processing in step S118 can be the same as that in step S108, and a description thereof will not be repeated.

FIG. 12 is a flowchart showing control of the map display mode. In the map display mode, the control unit 11 interrupts the through-image display operation on the display unit 18. After that, the control unit 11 displays the map image displayed on the display unit 18 on the full screen of the display unit 18 (step S201), as shown in FIG. 7. In case of the full-screen display operation, the map image data need not be corrected to the trapezoidal shape.

After the map image is displayed on the full screen, the control unit 11 determines whether or not the output from the acceleration detection unit 25, which detects an acceleration in the Z-axis direction, indicates a gravitational acceleration (step S202). If it is determined in step S202 that the output from the acceleration detection unit 25, which detects an acceleration in the Z-axis direction, does not indicate a gravitational acceleration (for example, when it is considered that the user holds the camera 1 at a landscape position), the control unit 11 determines whether or not the user has operated the mode button (step S203). If it is determined in step S203 that the user has not operated the mode button, the control unit 11 returns the process to step S201. If it is determined in step S203 that the user has operated the mode button, the control unit 11 returns the process to step S101.

If it is determined in step S202 that the output from the acceleration detection unit 25, which detects an acceleration in the Z-axis direction, indicates a gravitational acceleration, that is, if it is considered that the user holds the camera 1 in a downward-facing state, and the display surface of the display unit 18 faces upward, the control unit 11 determines whether or not the output from the acceleration detection unit 25, which detects an acceleration in the Y-axis direction, indicates a gravitational acceleration (step S204).

If it is determined in step S204 that the output from the acceleration detection unit 25, which detects an acceleration in the Y-axis direction, does not indicate a gravitational acceleration, that is, it is considered that the camera 1 is kept to have a downward orientation, the control unit 11 determines based on the output from the touchpanel 14 whether or not the user has made a touch operation on the upper portion of the map image (step S205).

If it is determined in step S204 that the output from the acceleration detection unit 25, which detects an acceleration in the Y-axis direction, indicates a gravitational acceleration, that is, if it is considered that the orientation of the camera 1 has changed from a downward orientation to a lateral orientation, or if it is determined that the user has made a touch operation on the upper portion of the map image, the control unit 11 advances the process to step S115. In this case, the display state shown in FIG. 7 is made to revert to that shown in FIG. 5B or 5C.

If it is determined in step S205 that the user has not made a touch operation on the upper portion of the map image, the control unit 11 determines whether or not an acceleration in the Y-axis direction has been produced (step S206). In step S206, for example, when the output from the acceleration detection unit 25, which detects an acceleration in the Y-axis direction, assumes a predetermined value or more, it is determined that an acceleration in the Y-axis direction has been produced. This acceleration threshold is recorded in advance in, for example, the program recording unit 12b as a control parameter.

If it is determined in step S206 that an acceleration in the Y-axis direction has not been produced, the control unit 11 returns the process to step S201. In this case, the enlarged display operation of the map image is continued. In contrast, if it is determined in step S206 that an acceleration in the Y-axis direction has been produced, that is, if it is considered that a forward acceleration is applied to the camera 1 in a downward-facing state, as shown in FIG. 13, the control unit 11 detects the current azimuth of the camera 1 from the output of the azimuth detection unit 23 (step S207). Subsequently, the control unit 11 displays a more distant map image in a direction parallel to the current azimuth of the camera 1 (step S208). After that, the control unit 11 returns the process to step S201.

Figure 14:
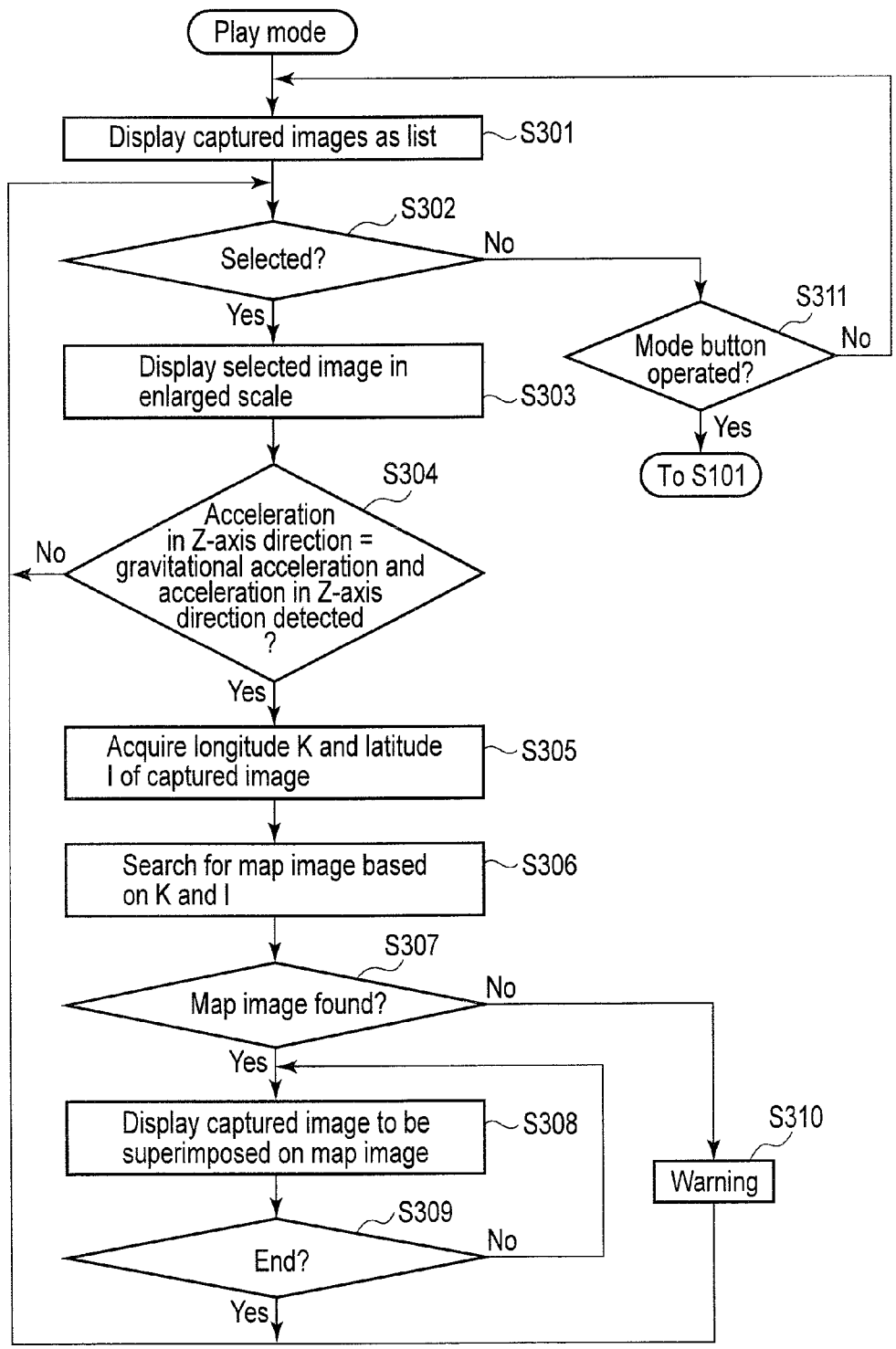
FIG. 14 is a flowchart showing control of a play mode.

FIG. 14 is a flowchart showing control of the play mode. In the play mode, the control unit 11 controls the display driving unit 17 to display a list of image files recorded in the image recording unit 22 on the display unit 18 (step S301). After that, the control unit 11 determines whether or not the user selects any of the image files displayed in the list (step S302).

If it is determined in step S302 that the user selects any of the image files, the control unit 11 plays back the selected image file (step S303). In this case, the control unit 11 reads out the image file via the recording/playback unit 21, and inputs the readout image file to the compression/decompression unit 20 to decompress captured image data. After that, the control unit 11 inputs the decompressed captured image data to the display driving unit 17 to display an enlarged image on the display unit 18.

After the image file is played back, the control unit 11 determines whether or not the output from the acceleration detection unit 25, which detects an acceleration in the Z-axis direction, is increased from a gravitational acceleration (step S304).

If it is determined in step S304 that the acceleration detection unit 25, which detects an acceleration in the Z-axis direction, is not increased from a gravitational acceleration, the control unit 11 returns the process to step S302. In contrast, if it is determined in step S304 that the output from the acceleration detection unit 25, which detects an acceleration in the Z-axis direction, is increased from a gravitational acceleration, that is, if it is considered that a downward acceleration is applied to the camera 1 in a downward-facing state, as shown in FIG. 15, the control unit 11 acquires longitude information K and latitude information I indicating a captured position of the captured image at a shooting timing from header information of the selected image file (step S305). Then, the control unit 11 searches the map data recording unit 12c for map image data including the acquired longitude information K and latitude information I (step S306).

After the search of the map image data, the control unit 11 determines whether or not the corresponding map image data is available (step S307). If it is determined in step S307 that the corresponding map image data is available, the control unit 11 reads out the corresponding map image data from the map data recording unit 12c, and displays a map image based on the readout map image data to be superimposed on the captured image, which is currently played back (step S308). In this case, for example, one of the captured image, which is currently played back, and the map image is displayed in a reduced scale.

After the map image is displayed, the control unit 11 determines whether or not the playback operation of the image file is ended (step S309). Whether or not to end the playback operation of the image file is determined by checking whether or not the user has operated, for example, a predetermined button which instructs to end the playback operation of the image file. If it is determined in step S309 that the playback operation of the image file is not ended, the control unit 11 returns the process to step S308. In contrast, if it is determined in step S309 that the playback operation of the image file is ended, the control unit 11 returns the process to step S302.

If it is determined in step S307 that the corresponding map image data is not available, the control unit 11 generates a warning message indicating that the corresponding map image data is not available for the user (step S310). In this case, for example, the control unit 11 displays the warning message on the display unit 18. In addition, an audio playback unit may be included, and an audible warning message may be generated.

If it is determined in step S302 that no image file is selected, the control unit 11 determines whether or not the user has operated the mode button (step S311). If it is determined in step S311 that the user has not operated the mode button, the control unit 11 returns the process to step S301. If it is determined in step S311 that the user has operated the mode button, the control unit 11 returns the process to step S101.

As described above, according to this embodiment, the display operation of the map image is started or the display range of the map image is switched in accordance with an acceleration (movement) in a direction parallel to the current azimuth of the camera 1. Thus, the user can easily make operations associated with the display operation of the map image while holding the camera 1 with both hands.

In this embodiment, when the user holds the camera 1, that is, when the display surface of the display unit 18 faces the user, a map image is corrected to the trapezoidal shape, and is then superimposed on a through-image. Thus, the user who viewed the map image feels a depth, and can easily ascertain the relationship between the captured image (through-image) and map image. When the user holds the camera 1 in a downward-facing state, that is, when the display surface of the display unit 18 faces upward, the map image is displayed on the full screen. In case of the map image shown in FIG. 4, when the display surface of the display unit 18 faces upward, since the map image corresponds to an actual landscape, the user can easily ascertain their relationship.

A modification of this embodiment will be described below.

In the example shown in FIG. 10, the operations of the azimuth detection unit 23, position detection unit 24, and acceleration detection unit 25 are started simultaneously with power-ON of the camera 1. In contrast, the azimuth detection unit 23, position detection unit 24, and acceleration detection unit 25 may be operated during an operation of, for example, a specific button. For example, the release button normally has a two-stroke button configuration. In this case, in response to pressing of the release button to the first stroke position, AF control and the like are executed, and a so-called focus lock function that maintains a focus of the focus lens is maintained during pressing of the release button to the first stroke position can be provided to the camera 1. By operating the azimuth detection unit 23, position detection unit 24, and acceleration detection unit 25 while the focus lock function is enabled, they can be operated at a timing at which a map image is most required at the time of shooting. Hence, consumption power can be reduced compared to a case in which they are always operated.

Upon acquisition of the map image data in step S108, map image data within a range according to a horizontal field angle of the imaging optical system is extracted. However, in practice, since a field angle in the vertical direction exists, a landmark which cannot be captured even within the horizontal field angle φ shown in FIG. 11A may exist depending on the angle of elevation of the camera 1. Therefore, when map image data has three-dimensional information (longitude, latitude, and altitude), it is desirable to acquire map image data within a range according to not only the field angle of the camera 1 but also the angle of elevation of the camera 1. The map image data having the three-dimensional information is that in which the height of a landmark is indicated by contours, as shown in, for example, FIG. 16.

Figure 17A:
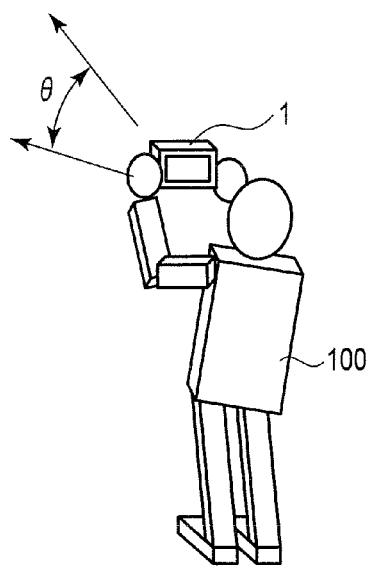
FIGS. 17A, 17B, and 17C are views showing an example of acquisition processing of map image data in consideration of altitude information.
Figure 17B:
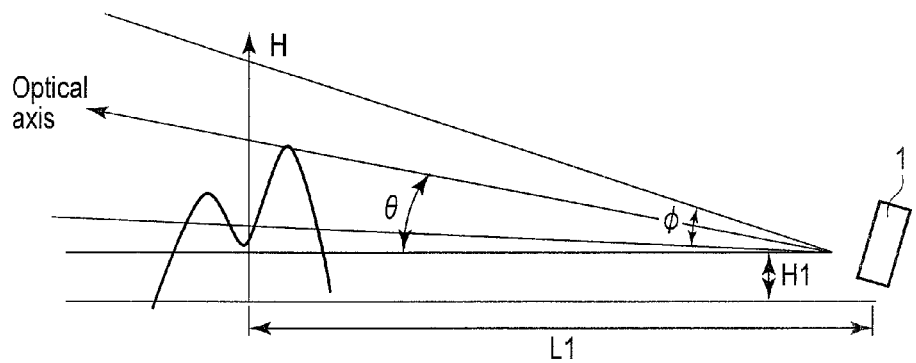
Figure 17C:
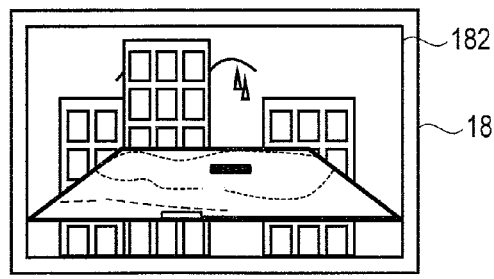

For example, assume that the user 100 holds the camera 1 to have an angle of elevation θ with respect to the ground surface, as shown in FIG. 17A. At this time, the optical axis of the camera 1 is tilted through θ with respect to the ground surface, as shown in FIG. 17B. Therefore, a range that can be shot by the camera 1 when viewed in a direction of an altitude H is that having a vertical field angle φ to have the optical axis as the center. When the height of a landmark separated by a distance L1 is lower than a height specified by the vertical field angle φ, that landmark cannot be shot. In practice, a range which considers a body height H1 of the user 100 is that which can be shot when viewed in the direction of the altitude H. If the body height H1 assumes a fixed value (for example, 1.5 m), it does not cause a larger error. The angle of elevation θ can be calculated from the output of the acceleration detection unit 25. A landmark which is determined not to be shot based on the relationship shown in FIG. 17B is removed, as shown in FIG. 17C. For example, a landmark whose altitude H satisfies H<H1+L1 tan(θ−φ/2) is removed from the acquired map image data to be displayed. In this way, the user can accurately confirm a landmark which can be shot in the direction of the camera 1 on the map image.

In the aforementioned embodiment, when the user moves the camera 1 as the portable apparatus forward while holding it at a landscape position, the display operation of the map image is started or the display range is switched. In practice, the user may often hold the camera 1 at a portrait position. When the user holds the camera 1 at a portrait position, the output from the acceleration detection unit, which detects an acceleration in the Y-axis direction, does not become a gravitational acceleration, but the output from the acceleration detection unit, which detects an acceleration in the X-axis direction, becomes a gravitational acceleration. However, even when the user holds the camera at a portrait position, since the display surface of the display unit 18 faces the user, the same control as that of the camera 1 held at a landscape position can be executed. In this case, in place of determination based only on the acceleration in the Y-axis direction in step S105 of FIG. 10, when a gravitational acceleration is detected in one of the Y- and X-axis directions, step S105 branches to step S106.

The aforementioned embodiment has exemplified the digital camera as the portable apparatus. However, the technique of the present invention is applicable to various other portable apparatuses (for example, a mobile phone) which can display a shot image and map image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable apparatus comprising:
a position detection unit configured to detect a position of the portable apparatus;
an azimuth detection unit configured to detect an azimuth of the portable apparatus;
a map image acquisition unit configured to acquire a map image within a range based on the position and the azimuth;
a display control unit configured to display the acquired map image on a display unit; and
an orientation detection unit configured to detect an orientation of the portable apparatus,
wherein the display control unit displays the map image on the display unit according to the detected orientation, and
wherein the map image acquisition unit is configured to set a size of the map image based on a setting state of the portable apparatus.

2. The apparatus of claim 1, further comprising an acceleration detection unit configured to detect an acceleration produced with respect to the portable apparatus,
wherein the map image acquisition unit is configured to acquire a map image including a range farther than the map image acquired based on the position and the azimuth when the acceleration detection unit detects an acceleration in a direction parallel to the azimuth detected by the azimuth detection unit.

3. The apparatus of claim 1, wherein the display control unit is configured to discriminate a direction of a display surface of the display unit based on the orientation of the portable apparatus detected by the orientation detection unit, and to display the map image on the display unit according to a discriminated change in direction of the display surface.

4. The apparatus of claim 3, further comprising an imaging unit configured to capture an image of an object to obtain a captured image,
wherein the display control unit is configured to shape the map image into a trapezoidal shape and to display the shaped map image on the display unit to be superimposed on the captured image when the display control unit discriminates that the direction of the display surface is perpendicular to a ground surface.

5. The apparatus of claim 3, wherein the display control unit is configured to display the map image on a full screen of the display unit when the display control unit discriminates that the direction of the display surface is parallel to a ground surface.

6. The apparatus of claim 1, further comprising a touch detection unit configured to detect a touch operation on a display surface of the display unit,
wherein the display control unit is configured to display the map image on the display unit according to a touched position detected by the touch detection unit.

7. The apparatus of claim 1, further comprising an imaging unit configured to capture an image of an object to obtain a captured image,
wherein the map image acquisition unit is configured to decide a width of a direction perpendicular to the azimuth of the map image to be acquired based on a field angle of the imaging unit.

8. A portable apparatus comprising:
a position detection unit configured to detect a position of the portable apparatus;
an azimuth detection unit configured to detect an azimuth of the portable apparatus;
a map image acquisition unit configured to acquire a map image within a range based on the position and the azimuth;
a display control unit configured to display the acquired map image on a display unit; and
an orientation detection unit configured to detect an orientation of the portable apparatus, wherein the display control unit displays the map image on the display unit according to the detected orientation, and wherein the map image acquisition unit is configured to set a width in a direction perpendicular to the azimuth of the map image to be acquired to be a fixed width.

9. A portable apparatus comprising:
a position detection unit configured to detect a position of the portable apparatus;
an azimuth detection unit configured to detect an azimuth of the portable apparatus;
a map image acquisition unit configured to acquire a map image within a range based on the position of the azimuth;
a display control unit configured to display the acquired map image on a display unit;
an orientation detection unit configured to detect an acceleration produced with respect to the portable apparatus,
wherein the display control unit displays the map image on the display unit according to the detected orientation, and
wherein the map image acquisition unit is configured to further decide a width in a direction parallel to the azimuth of the map image to be acquired based on a magnitude of the acceleration detected by the acceleration detection unit.

10. The apparatus of claim 1, further comprising an imaging unit configured to capture an image of an object to obtain a captured image,
wherein the map image acquisition unit is configured to further decide a width in a direction parallel to the azimuth of the map image to be acquired based on a focal length of the imaging unit.

11. A portable apparatus comprising:
a position detection unit configured to detect a position of the portable apparatus;
an azimuth detection unit configured to detect an azimuth of the portable apparatus;
a map image acquisition unit configured to acquire a map image within a range based on the position and the azimuth;
a display control unit configured to display the acquired map image on the display unit; and
an orientation detection unit configured to detect an orientation of the portable apparatus,
wherein the display control unit displays the map image on the display unit according to the detected orientation,
wherein the map image is a map image having altitude information, and
wherein the map image acquisition unit is configured to discriminate an angle of elevation of the portable apparatus based on an orientation of the portable apparatus detected by the orientation detection unit, and to remove a landmark having an altitude lower than an altitude specified by the discriminated angle of elevation from the acquired map image.

12. A portable apparatus comprising:
a position detection unit configured to detect a position of the portable apparatus;
an azimuth detection unit configured to detect an azimuth of the portable apparatus;
a map image acquisition unit configured to acquire a map image within a range based on the position and the azimuth;
a display control unit configured to display the acquired map image on a display unit; and
an orientation detection unit configured to detect an orientation of the portable apparatus,
wherein the display control unit is configured to display the map image on the display unit to be horizontally seen when a direction of a display surface discriminated from an orientation of the portable apparatus detected by the orientation detection unit is perpendicular to a ground surface, and
wherein the map image acquisition unit is configured to set a size of the map image based on a setting state of the portable apparatus.

13. The portable apparatus of claim 1 further comprising an imaging unit configured to capture an image of an object to obtain a captured image,
wherein the map image acquisition unit is configured to set a size of the map image based on a setting state of the imaging unit.

14. The portable apparatus of claim 12 further comprising an imaging unit configured to capture an image of an object to obtain a captured image,
wherein the map image acquisition unit is configured to set a size of the map image based on a setting state of the imaging unit.

* * * * *